United States Patent [19]

DeLong

[11] Patent Number: 4,466,158
[45] Date of Patent: Aug. 21, 1984

[54] METHOD AND APPARATUS FOR SEPARATING VISCERA FROM AND SPLITTING GIZZARDS

[76] Inventor: Horace DeLong, Rte. 6, Box 257 A, Macon, Ga. 31201

[21] Appl. No.: 368,982

[22] Filed: Apr. 16, 1982

Related U.S. Application Data

[62] Division of Ser. No. 115,960, Jan. 28, 1980, Pat. No. 4,325,165.

[51] Int. Cl.³ ............................................. A22C 21/00
[52] U.S. Cl. ............................................. 17/52; 17/11
[58] Field of Search ............................... 17/11, 52, 58

[56] References Cited

U.S. PATENT DOCUMENTS 2,663,899 12/1953 Biddinger et al. ...................... 17/11
3,187,376 6/1965 Laws ................................... 17/52 X
3,707,019 12/1972 Wiggins ................................. 17/58

Primary Examiner—Willie G. Abercrombie
Attorney, Agent, or Firm—Thomas & Kennedy

[57] ABSTRACT

The gizzard with crop and other viscera attached thereto are retrieved from a cavity of a bird on an overhead conveyor system, and with viscera hanging from the gizzard, the gizzard is moved over a cutter whose elements define an open ended cutting path which severs the viscera from the gizzard. The gizzard is placed on a double chain conveyor with its opening facing rearwardly, and the conveyor carries the gizzard to a cutter which cuts through from the rounded end toward the opening of the gizzard and urges any hard objects in the gizzard toward the opening of the gizzard. The gizzard is placed on a pair of counter rotating helical toothed peeler rolls with a gap formed in the teeth of at least one of the rolls along at least some of the length of the roll, and a flow of air is induced between the rolls to urge the gizzard in contact with the rolls.

7 Claims, 13 Drawing Figures

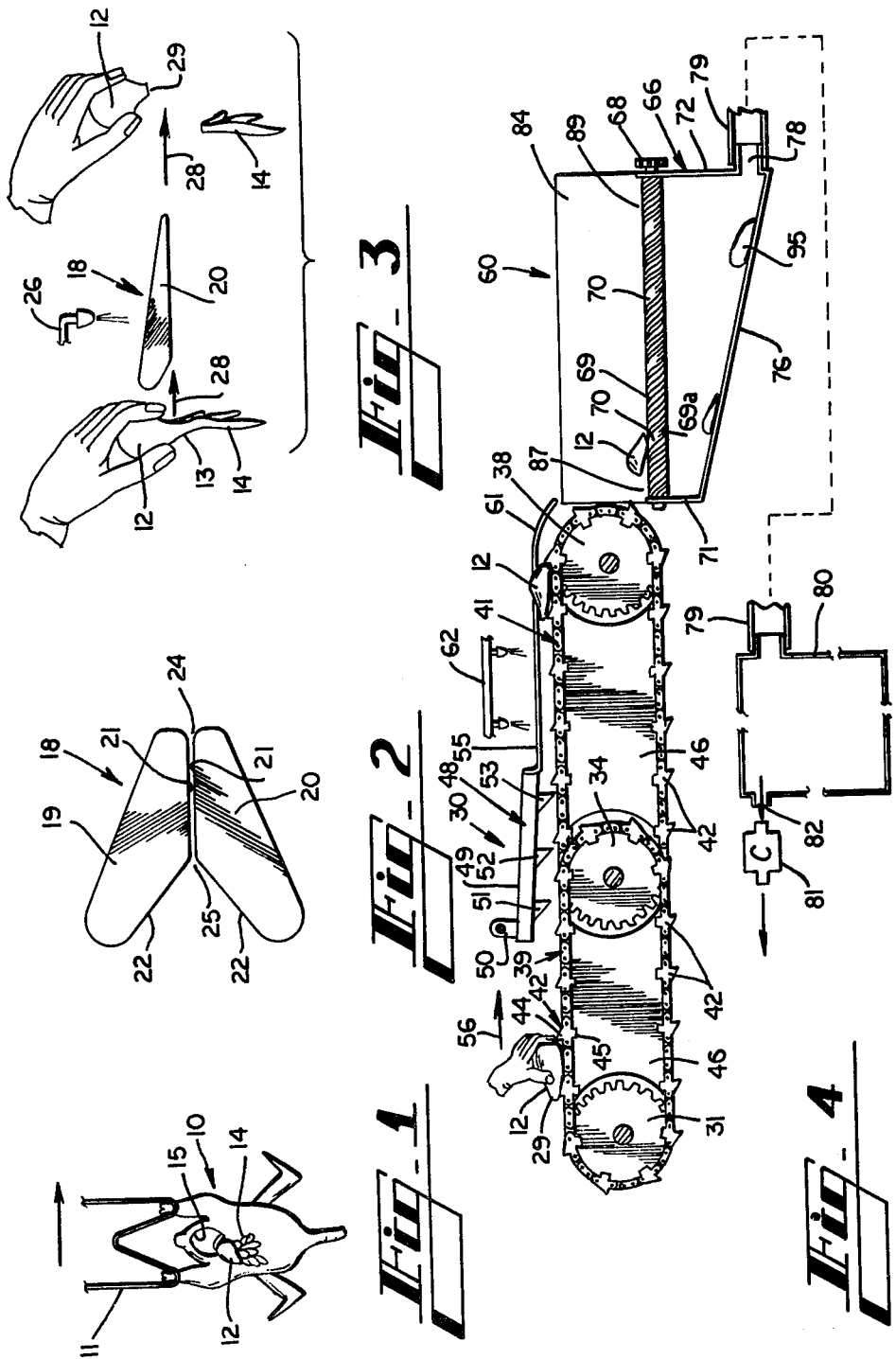

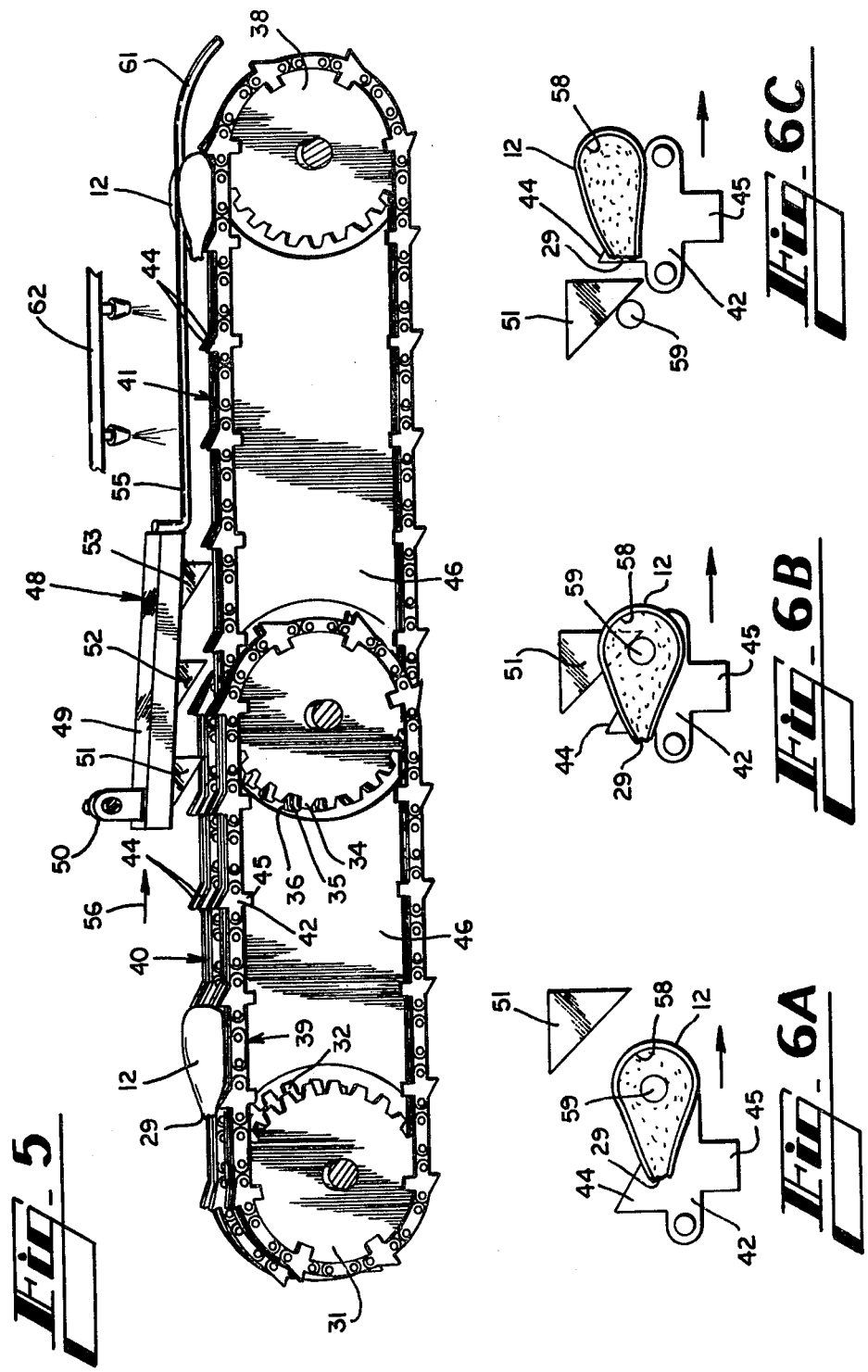

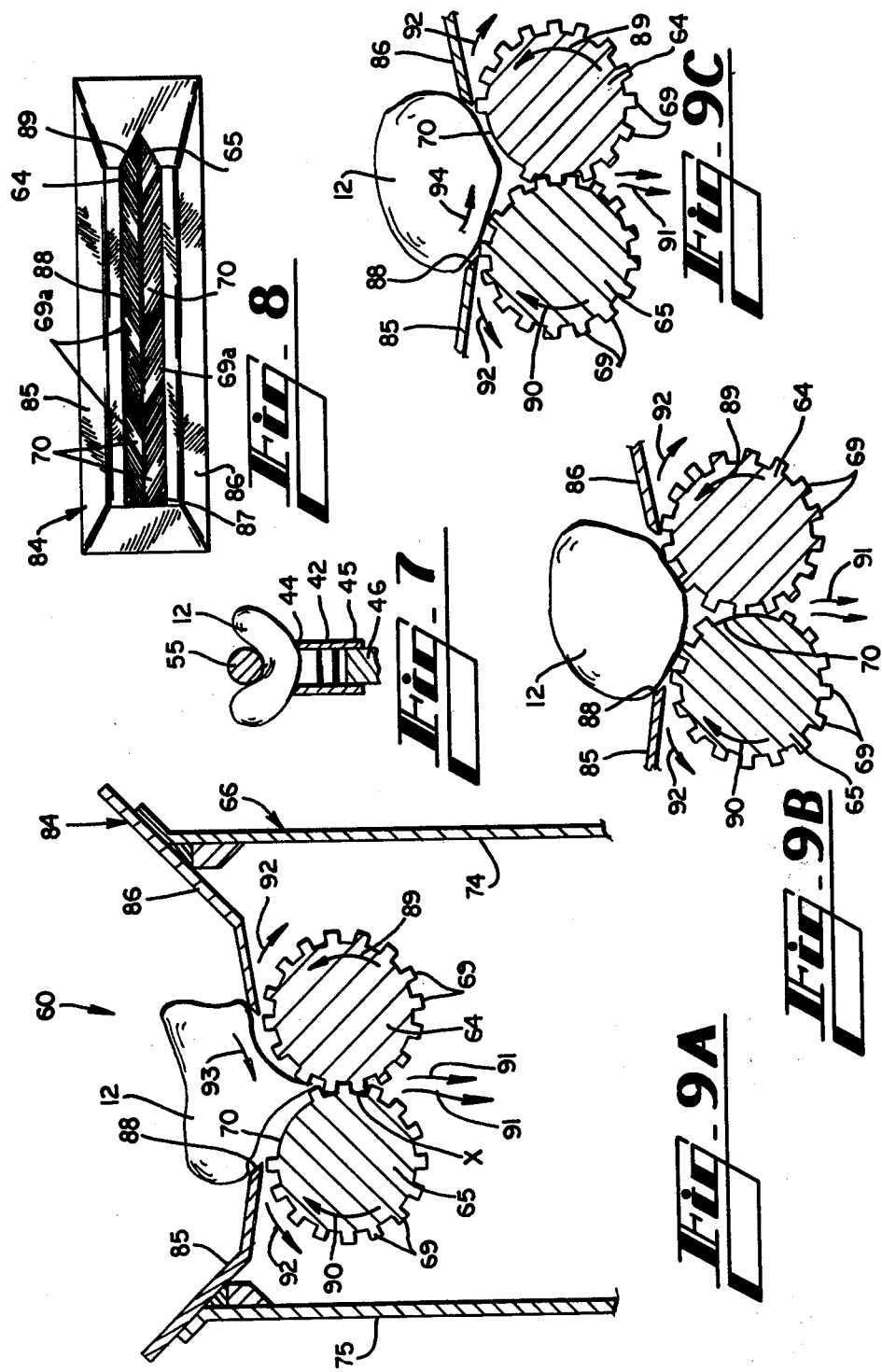

METHOD AND APPARATUS FOR SEPARATING VISCERA FROM AND SPLITTING GIZZARDS

This application is a division of application Ser. No. 115,960 filed Jan. 28, 1980, now U.S. Pat. No. 4,325,165, issued Apr. 20, 1982.

BACKGROUND OF THE INVENTION

This invention relates to poultry harvesting equipment, particularly to equipment for removing viscera from poultry gizzards, splitting the gizzards, and peeling the lining from the gizzards.

Poultry gizzards usually are removed from the carcass of slaughtered fowl with the crop, stomach, lungs, heart and other viscera attached thereto, and the gizzards usually are separated from the viscera by severing the connection immediately adjacent the gizzard. The gizzard is then split open between the side muscles of the gizzard and the lining peeled therefrom. The gizzard is then washed and ready for marketing.

Various automated equipment has been developed and utilized in the past to perform the steps of separating the viscera from the gizzard, for splitting open the gizzard and for peeling the gizzard. Some of the problems with the prior art equipment include improper severing of the viscera from the gizzard, cutting across instead of between the muscles of the gizzard and failing to remove the lining from the gizzard during the peeling process. Some of the prior art equipment is substantially complex and expensive in its design, yet fails to reliably perform the harvesting process. The gizzards and viscera frequently become jammed in and/or damaged by the equipment, and the equipment improperly performs the harvesting process, thereby requiring some of the gizzards to be reprocessed or, in some instances, damaging the gizzards so that they are unusable.

Poultry gizzards sometimes contain hard objects in the cavity between the muscles, and when the gizzards with hard objects therein are harvested, the hard objects tend to obstruct the harvesting operation. For example, when the cut is made in a gizzard to split the gizzard, the cutting element may engage a stone, etc. in the gizzard which tends to retard the cutting of the gizzard and tends to cause the gizzard to be pushed out of alignment with respect to the harvesting equipment, sometimes resulting in a "cross cut" across the muscles of the gizzard. Additionally, when the lining is being peeled from the gizzards, the teeth of the rotary peeling rolls fail to grasp the lining and the gizzard remains unpeeled.

SUMMARY OF THE INVENTION

Briefly described, the present invention comprises an improved gizzard harvester for more reliably removing the viscera from gizzards, splitting the gizzards and removing the lining from the gizzards. The gizzard and the attached viscera are removed from the cavity of a bird suspended from and moving along an overhead conveyor system, the gizzards are held with the point of attachment of the viscera thereto facing in a downward direction and with the viscera suspended therebelow, and the gizzard is then passed through a cutting element, with the gizzard on the upper side of the cutting element and the viscera suspended below the cutting element, whereby the cutting element severs the viscera from the gizzard immediately adjacent the point of attachment of the viscera to the gizzard.

The gizzard is then placed on a chain conveyor system with the opening of the gizzard facing rearwardly with respect to the direction of movement of the conveyor system, and the gizzards are moved to a cutter which cuts from the rounded closed portion of the gizzard, between the muscles of the gizzard, toward the opening of the gizzard. The relative movement of the gizzard with respect to the cutter causes the gizzard to compress, and the cutter passes through the cavity of the gizzard where any hard objects might be present, and the cutter thus urges any hard objects in the cavity toward the gizzard opening, tending to expel the hard objects through the gizzard opening.

The gizzard then is discharged to oppositly rotating spiral threaded peeler rolls. At least one of the peeler rolls has a gap formed in its teeth along at least a portion of its length, and a flow of air is induced downwardly about the peeler rolls so as to induce the lining of the gizzards to move in contact with the spiral teeth of the peeler rolls.

Thus, it is an object of this invention to provide an improved gizzard harvester which reliably and expediently splits and peels poultry gizzards.

Another object of this invention is to provide a gizzards splitter which tends to expel hard objects from the cavity of poultry gizzards during the cutting operation.

Another object of this invention is to provide a gizzard peeler attachment for a gizzard harvester which tends to turn the gizzard during the peeling process to cause the lining of the gizzard to be engaged by the meshed teeth of the peeler rolls.

Another object of this invention is to provide a peeler roll assembly for a gizzard harvester which includes means for inducing a flow of air downwardly between and about the peeler rolls to induce the gizzards to make positive contact with the peeler rolls.

Other objects, features and advantages of the present invention will become apparent upon reading the following specification, when taken in conjunction with the accompanying drawings.

BRIEF DESCRIPTION OF THE DRAWINGS

FIG. 1 is a schematic illustration of a carcass of a partially processed bird, illustrating the manner in which the gizzard and attached viscera have been partially removed from the cavity of the bird as the bird is suspended from a shackle and is being moved along an overhead conveyor in a poultry processing plant.

FIG. 2 is a top view of the viscera cutter.

FIG. 3 is a progressive side schematic illustration of the manner in which the viscera cutter of FIG. 2 is used by the worker to sever the viscera from the gizzard.

FIG. 4 is a side view of the gizzard harvester, with the framework, driving motors, driving chains, etc. removed for clarity.

FIG. 5 is a partial perspective illustration of the gizzard splitter.

FIGS. 6A, 6B, and 6C are progressive schematic illustrations of the manner in which the gizzard is cut or "split".

FIG. 7 is an end detail illustration of the discharge conveyor chain and guide rod, showing the manner in which the split gizzard is dicharged from the gizzard splitter.

FIG. 8 is a partial plan view of the peeler roll assembly.

FIGS. 9a, 9b, and 9c are end cross sectional views of the peeler rolls, illustrating the manner in which the gizzards are contacted by the peeler rolls.

DETAILED DESCRIPTION

Referring now in more detail to the drawings, in which like numerals indicate like parts throughout the several views, FIG. 1 illustrates a bird 10 as it is moved on a shackle 11 by an overhead conveyor system (not shown) through a poultry processing plant, with the gizzard 12 and viscera 14 attached thereto having been partially pulled from the cavity 15 of the bird. It will be noted that the head of the bird has been removed, and the head removal equipment also has severed the crop at a position adjacent the head position.

Cutter 18 comprises a pair of cutting elements or plates 19 and 20 which are placed in side by side relationship. Each plate includes a cutting edge 21 and an angled edge surface 22 merging with the cutting edge at an angle greater than 90°. The cutting edges 21 of the cutting elements 19 and 20 are rectilinear and are placed in parallel juxtaposition so as to form an open ended cutting path 24 therebetween. The angled edge surfaces 22 of the cutting elements 19 and 20 form a converging entry path that merges with cutting path 24. The cutting elements 19 and 20 have upper convex surfaces (FIG. 3) and a water wash system 26 is used to clean the cutter.

The worker reaches into the cavity 15 of the bird 10 and pulls the crop, gizzard and attached viscera from the bird with one hand. The worker then grasps the gizzard 12 with the other hand, being careful to orient the gizzard with its point of connection 13 with respect to the viscera oriented downwardly. The viscera 14 becomes suspended downwardly with respect to the gizzard 12, and the worker moves the gizzard and viscera into the converging entry path 25 of cutter 18, being careful to place the gizzard just above the cutting elements 19 and 20 and permitting the viscera to be suspended below the level of the cutter. The worker continues to move the gizzard and viscera through the cutting path 24 of cutter 18, and the cutting edges 21 of the cutting elements sever the viscera 14 from the gizzard 12. The cutting path 24 is substantially narrower than the diameter of the gizzard 12 and the worker presses the gizzard 12 downwardly as the gizzard moves through the cutting path, thereby assuring that the viscera is severed from the gizzard at a position immediately adjacent the surface of the gizzard.

The worker then places the gizzard 12 on the gizzard splitter 30 with the opening 29 of the gizzard facing rearwardly with respect to the direction of movement of the gizzard through the splitter 30.

As illustrated in FIGS. 4 and 5, gizzard splitter 30 comprises infeed sprockets 31 and 32, transfer sprockets 34, 35, 36, and discharge sprocket 38. A pair of feed conveyor chains 39 and 40 extend about infeed sprockets 31 and 32 and about the outside transfer sprockets 34, and 36, while a discharge conveyor chain 41 extends about middle transfer sprocket 35 and discharge sprocket 38. Conveyor chains 39-41 are roller chains, and special conveyor chain links 42 are included among the conventional links in the chain structures. Special conveyor chain links 42 include outwardly extending pointed portions 44 and inwardly extending guide portions 45. Flat guide plates 46 are positioned between the sprockets of each chain and the guide portions 45 of the special conveyor chain links 42 are arranged to straddle the guide plate 46 as the chain progresses between the sprockets. The outwardly extending pointed portions 44 of the special conveyor chain links 42 are arranged to engage and to carry the gizzards 12 along a rectilinear path 56 across gizzard splitter 30.

Cutter 48 is positioned above the path of travel of the gizzards 12 across the upper flights of the conveyor chains 39-41, and is located approximately above the transfer sprockets 34-36, in alignment with the discharge conveyor chain 41. Cutter 48 includes cutter support 49 suspended over the conveyor chains by its clevice 50 and a series of cutting blades 51, 52, and 53 extending downwardly along the cutter support in alignment with one another and in alignment with the centrally located discharge conveyor chain 41. Guide rod 55 is attached at one of its ends to cutter support 49 and extends from cutter support 49 over and along the length of discharge conveyor chain 41. Guide rod 55 extends in substantially the same plane as cutting blades 51-53, which is between the pointed portions 44 of the special conveyor links 42 of discharge conveyor chain 41.

The sprockets 31, 32, 34, 35, 36 and 38 are driven through a drive chain and sprocket (not shown), either from a motor or from a drive system connected to the overhead conveyor system. The upper flights of the conveyor chains 39-41 move in the direction indicated by arrow 56, so as to move the gizzard 12 along a rectilinear path beneath the cutter 48. The gizzards are placed on the upper flight of the conveyor chains 39, 40, usually with the opening of the gizzard facing rearwardly and the rounded portion of the gizzard facing in the direction of movement 56, with the gizzard 12 cradled between the feed conveyor chains 39, 40. As the gizzards reach cutter 48, the discharge conveyor chain 41 moves upwardly into engagement with the bottom surface of the gizzard 12 to add additional support to the gizzard, and the first of the cutting blades 51 engages the rounded portion of the gizzard. At this instant, the gizzard is supported on all three conveyor chains. As the first cutting blade 51 engages the rounded portion of the gizzard (FIG. 6A), the gizzard is compressed (FIG. 6B) and the blade cuts between the muscles of the gizzard into the cavity 58. If any hard objects such as a stone 59 are present in the cavity 58, the relative movement of the gizzard 12 and the blade 51 causes the stone 59 to be urged toward the opening 29 (FIG. 6C), tending to expel the stone from the gizzard. The cutting of the gizzard will be repeated by the subsequent cutting blades 52 and 53, so that if the gizzard is not completely cut by the first blade, or if the stone is not removed by the first cut made into the gizzard, the subsequent cutting blades will finish the cut and will tend to expel the stone.

As illustrated in FIG. 7, when the gizzard moves out from beneath cutter 48, it will have been split, with its upper surface opened, and the guide rod 55 will be positioned in the upwardly facing space formed between the side muscles of the gizzard, and will tend to hold the gizzard down on the discharge conveyor chain 41.

Water wash equipment 62 is used to continuously clean the equipment. While only a single water wash conduit is illustrated, it will be understood that various water wash conduits and nozzles will be positioned at various locations to properly clean the equipment during its operation.

As illustrated in FIG. 4, when the gizzard 12 reaches the end of the upper flight of the discharge conveyor chain 41, the gizzard is allowed to fall to the peeler 60 which is located slightly below the end of the upper flight of the conveyor chains 39"41. The configuration of the end portion 61 of guide rod 55, together with the movement of the discharge conveyor chain 41, causes each gizzard 12 to flip over as it lands on the peeler 60 so that the lining faces the peeler rolls. Peeler 60 includes a pair of peeler rolls 64 and 65 (FIGS. 8 and 9A-9C). Each peeler roll is formed with a plurality of helical threads extending thereabout, with the threads of one roll meshed with the threads of the other roll, with the rolls extending in a horizontal plane, parallel to each other and extending away from the discharge end of the gizzard splitter. The peeler rolls are rotatably supported at their ends by bearings (not shown) in housing 66, and the peeler rolls are driven by a sprocket 68 and chain and motor (not shown) in the usual manner, with the upper surfaces of each roll moving downwardly in between the adjacent rolls.

Typically, a peeler roll 64, 65 includes fourteen helical teeth 69 extending thereabout. In the illustrated embodiment, two adjacent teeth are removed at intervals along each peeler roll to form spiral gaps 70 in the teeth. The gaps 70 extend along one roll for a portion of the length of the roll, and then the teeth 69a that had been interrupted to form the gaps continue again for another segment of the roll length. The gaps 70 in the embodiment disclosed herein extend for a length of two inches along the fourteen inch peeler rolls, and the interupted teeth 69a extend for an intervening two inches along the length of the rolls. The gaps of one roll are staggered with respect to the gaps of the other roll, and a single gap extends approximately the full circumference about a peeler roll.

Housing 66 of Peeler 60 (FIG. 4) comprises upright end walls 71 and 72, upright side walls 74 and 75 (FIG. 9A) and sloped bottom wall 76. An outlet opening 78 is formed at the lower end of sloped bottom wall 76 through upright end wall 72, and exhaust conduit 79 is connected to opening 78. Conduit 79 connects to collection chamber 80, and compressor 81 has its entrance opening connected to the outlet opening 82 of collection chamber 80.

As illustrated in FIGS. 8 and 9A, cover plate 84 extends over the upper portion of housing 66 and includes downwardly and inwardly converging side plates 85 and 96 that define an elongated slot 88 positioned over peeler rolls 64 and 65. The longitudinal center line of the elongated slot 88 extends vertically over the intersection of the meshed peeler roll 64 and 65, with portions of the side plates 85 and 86 converging downwardly toward the upper downwardly moving surfaces of the peeler rolls.

When a gizzard 12 is discharged from the gizzard splitter 30 onto the rotating peeler rolls 64 and 65, the upper surfaces of the peeler rolls rotate in the directions indicated by arrows 89 and 90 so that the upper surface of each roll moves in a downward arc toward meshed relationship with the other peeler roll. The compressor 81 (FIG. 4) continuously induces a flow of air from outside housing 66 downwardly through slot 88 and between and about peeler rolls 64 and 65 as illustrated by flow arrows 91 and 92. This tends to cause the gizzards 12 to be urged into contact with the teeth of the peeler rolls. Additionally, the continual rotation of the peeler rolls tends to urge the gizzards 12, particularly the lining of the gizzards, inwardly and downwardly with respect to the peeler rolls, whereupon the linings are caught by the meshing teeth of the peeler rolls and the linings are pulled downwardly from the muscles of the gizzards. Additionally, the helical configuration of the teeth 69 tends to progressively urge the gizzards from the entrance end 87 to the discharge end 89 of the peeler rolls, so that each gizzard is progressively moved across and ultimately off the peeler rolls.

As illustrated in FIG. 9A, when a gap 70 in the teeth 69 of a peeler roll moves from beneath the cover plate into the area of the slot 88 in the cover plate (FIG. 9A), the gap 70 does not apply as much friction to the bottom surface of the gizzard 12 while the teeth in the similar location but on the opposite roller continue to apply friction to the bottom surface of the gizzard, causing the gizzard to tend to turn or tumble in the direction as indicated by arrow 93. When the gap 70 faces the opposite peeler roll (FIG. 9B), the teeth 69 gain grasp at the gizzard and attempt to pull the gizzard inwardly and downwardly from both directions. Additionally, the presence of the gap 70 between the peeler rolls permits additional air flow to pass between the peeler rolls as indicated by flow arrows 91. In the meantime, air flow continues to pass about the upper and outer surfaces of the peeler rolls as indicated by flow arrows 92.

After the gizzard has passed further along the peeler rolls, it moves beyond the gap in the teeth of one peeler roll (FIGS. 9A and 9B) to a location to where there is a gap 70 on the opposite peeler roll (FIG. 9C). The presence of the gap 70 on the oppsite peeler roll again reduces the pulling friction of that peeler roll on the gizzard while the pulling friction of the opposite peeler roll is maintained, causing the gizzard 12 to tend to turn or tumble in the direction as indicated by arrow 94. In the meantime, the continuous flow of air between and about the gizzard peeler roll is maintained.

It will be noted that the continuous low pressure maintained within housing 66 tends to pull cover plate 84 downwardly toward peeler rolls 64 and 65. Additionally, the continual operation of the peeler rolls in conjunction with the gizzards causes an accumulation of fat and other debris on and between the teeth of the peeler rolls. As the fat and debris accumulate on the peeler rolls, the flow passages for the air about and between the peeler rolls is diminished, resulting in a lower air pressure being created within housing 66. When the air pressure is reduced, higher velocity air moves between and about the peeler rolls. The air moving about the peeler rolls tends to clean the peeler rolls by inducing the accumulated fat in the helical threads of the rolls to move off the rolls, as by blowing the fat off the rolls. As the fat accumulates between the teeth as the pressure differential across the peeler rolls increases, the increased air velocity about and between the peeler rolls more vigorously cleans the rolls.

A water wash system is also used in conjunction with the peeler 60 to continuously clean the cover plate and peeler rolls. The water moving about the peeler rolls in conjunction with the continuous flow of air about the peeler rolls tends to assist in the removal of fat and other material from the teeth of the peeler rolls. The linings 95 and other matter removed from the gizzards pass between the peeler rolls and drop inside housing 66. The water tends to wash the linings and other matter down the sloped bottom wall 76 to the conduit 79, where the relatively fast moving flow of air induces the water and linings, etc. to move through the conduit to the collection chamber 80.

It should be understood, of course, that the foregoing relates only to a preferred embodiment of the present invention and that numerous modifications or alterations may be made therein without departing from the spirit and scope of the invention as set forth in the appended claims.

I claim:

1. A method of treating poultry gizzards wherein the gizzards each define an opening comprising moving a series of gizzards on a surface conveyor along a path with the gizzard openings unobstructed and facing in the direction approximately opposite to the direction of movement of the gizzards, and cutting with a substantially stationary cutting blade into each gizzard generally toward its gizzard opening as the gizzard is moved along the path whereby solid objects in the gizzards tend to be expelled through the openings of the gizzards.

2. A method of splitting poultry gizzards wherein the gizzards each define an opening comprising placing gizzards in spaced relationship with respect to one another on a surface conveyor and moving the gizzards in series on the conveyor along a path toward a cutting blade with the gizzard openings unobstructed and facing away from the cutting blade, and cutting with the cutting blade through each gizzard with the cutting blade cutting toward the openings of the gizzards, whereby solid objects in the gizzards tend to be expelled through the openings of the gizzards by the engagement of the cutting blade and the gizzards.

3. A method of processing poultry gizzards comprising retrieving the gizzard and attachments thereto from the cavity of a slaughtered bird, severing the attachments from the gizzard and leaving an opening in the gizzard where the attachments were removed, cutting through the gizzard with a cutting movement toward the opening of the gizzard, placing the split gizzard on a pair of parallel meshed spiral toothed peeler rolls, rotating the rolls, inducing a flow of air between the peeler rolls, and intermittently turning the gizzard with respect to the peeler rolls.

4. A method of splitting poultry gizzards wherein the gizzards have the viscera detached therefrom and each gizzard defines an opening at the position where the viscera was attached, comprising cutting with a cutting element into the gizzard at a position remotely located from the opening of the gizzard and cutting with the cutting element toward the opening of the gizzard and urging with the cutting element any solid elements present in the gizzard toward the opening of the gizzard.

5. Apparatus for removing viscera from poultry gizzards comprising a pair of cutting plates positioned in side-by-side relationship with each cutting plate including a substantially rectilinear cutting edge and with the cutting edges of each cutting plate facing the cutting edge of the other cutting plate so that an open ended cutting path is defined between the cutting plates, each said cutting plate including an angled edge surface merging with its cutting edge at an angle greater than a right angle, with the angled edge surfaces of the cutting plates forming a converging entry path that merges with the cutting path, whereby the poultry gizzards are supported with the viscera attached thereto hanging downwardly therefrom and with the point of attachment of the viscera to the gizzard facing downwardly and the gizzard and the viscera are moved first through the converging entry path and then through the cutting path with the viscera below the cutting plates and the gizzard above the cutting plates and the cutting edges of the cutting plates sever the viscera from the gizzard.

6. The apparatus of claim 5 and wherein both of said cutting edges are sharp for the purpose of severing the viscera from the gizzard.

7. The apparatus of claim 5 and wherein one of said cutting edges is sharp for severing the viscera from the gizzard.

* * * * *